United States Patent [19]
Purcell et al.

[11] Patent Number: 5,779,299
[45] Date of Patent: Jul. 14, 1998

[54] APPARATUS FOR ACHIEVING AUTOMOTIVE VEHICLE ROOF ISOLATION

[75] Inventors: George F. Purcell, Southgate; Adam A. Erickson, Novi; Robert A. Patterson, Garden City, all of Mich.; B. Michael Flaherty, Fort Wayne, Ind.

[73] Assignee: ASC Incorporated, Southgate, Mich.

[21] Appl. No.: 794,875

[22] Filed: Feb. 5, 1997

Related U.S. Application Data

[63] Continuation of Ser. No. 480,272, Jun. 7, 1995, abandoned.

[51] Int. Cl.$^6$ ............................................. B60J 7/12
[52] U.S. Cl. ................. 296/121; 296/122; 292/DIG. 5; 16/DIG. 33; 403/221; 267/276
[58] Field of Search ..................... 296/107, 108, 296/116–118, 121–122; 267/275, 276; 292/DIG. 5, DIG. 56, DIG. 73, 341.12; 16/DIG. 33, 288; 403/220, 221

[56] References Cited

U.S. PATENT DOCUMENTS

| | | | |
|---|---|---|---|
| 1,184,734 | 5/1916 | Freeman | 296/107 |
| 1,911,866 | 5/1933 | Wylig | 16/DIG. 33 |
| 2,009,614 | 7/1935 | Geyer | 403/220 |
| 2,076,243 | 4/1937 | Marshall et al. | 296/107 |
| 2,232,386 | 2/1941 | Hammerl | 296/121 |
| 2,606,788 | 8/1952 | Dietrich | 403/220 |
| 2,704,225 | 3/1955 | Anschuetz et al. | 296/107 |
| 2,824,751 | 2/1958 | Wilfert | 267/276 |
| 2,841,441 | 7/1958 | Evans | 296/117 |
| 2,916,327 | 12/1959 | Gilson | 292/DIG. 5 X |
| 2,919,156 | 12/1959 | Dodge | 296/107 |
| 3,047,332 | 7/1962 | Carpenter | 296/116 |
| 3,263,984 | 8/1966 | Linn | 267/275 |
| 3,278,221 | 10/1966 | Jaulmes | 296/107 X |
| 3,338,624 | 8/1967 | Champion | 296/136 |
| 3,377,099 | 4/1968 | Podolan | 296/136 |
| 3,411,821 | 11/1968 | Adamski | 296/117 |
| 3,425,742 | 2/1969 | Rauber, Jr. | 296/121 |
| 3,575,464 | 4/1971 | Himka et al. | 296/117 |
| 3,582,132 | 6/1971 | Gunning | 296/190 |
| 3,666,317 | 5/1972 | Podwya | 296/121 X |
| 3,994,524 | 11/1976 | Lehmann | 296/107 |
| 4,440,436 | 4/1984 | Giddens et al. | 296/107 |
| 4,470,626 | 9/1984 | Gergoe et al. | 296/341.12 |
| 4,573,732 | 3/1986 | Muscat | 296/108 |
| 4,618,180 | 10/1986 | Muscat | 296/107 X |
| 4,634,171 | 1/1987 | McKeag | 296/108 |
| 4,702,505 | 10/1987 | Alexander | 292/251 |
| 4,720,133 | 1/1988 | Alexander et al. | 296/117 |
| 4,746,162 | 5/1988 | Maness | 160/DIG. 3 |
| 4,746,163 | 5/1988 | Muscat | 296/107 X |
| 4,840,421 | 6/1989 | Hennessy | 296/122 |
| 4,854,634 | 8/1989 | Shiraishi et al. | 296/108 |

(List continued on next page.)

FOREIGN PATENT DOCUMENTS

| | | | |
|---|---|---|---|
| 573069 | 3/1959 | Canada | 403/221 |
| 557.699 | 8/1923 | France . | |
| 557699 | 8/1923 | France | 296/108 |
| 753.940 | 10/1933 | France . | |
| 774.595 | 12/1934 | France . | |
| 1034487 | 7/1958 | Germany | 267/276 |
| 430910 | 2/1948 | Italy | 296/117 |
| 127732 | 6/1986 | Japan | 267/276 |
| 838473 | 6/1960 | United Kingdom | 403/220 |

OTHER PUBLICATIONS

Lord Bonded Rubber Products, Brochure. Undated.
About Cars/Marshall Schuon. The New York Times SPORTS Sunday, Dec. 12, 1993, p. 29.

*Primary Examiner*—Dennis H. Pedder
*Attorney, Agent, or Firm*—Harness, Dickey & Pierce, P.L.C.

[57] ABSTRACT

An isolation apparatus reduces vibrations and destructive twisting forces otherwise transmitted between an automotive vehicle body and roof. A striker isolator and a roof pivot isolator are provided. Furthermore, a hinge isolator is provided between a pair of foldable roof sections. These isolators are ideally suited for use in combination with convertible roofs.

20 Claims, 6 Drawing Sheets

U.S. PATENT DOCUMENTS

| | | | |
|---|---|---|---|
| 4,958,882 | 9/1990 | Kolb | 296/108 |
| 4,981,313 | 1/1991 | Makumura | 292/DIG. 56 X |
| 4,984,841 | 1/1991 | Bauer et al. | 296/118 |
| 5,004,291 | 4/1991 | Bauer et al. | 296/116 |
| 5,085,483 | 2/1992 | Alexander | 296/121 |
| 5,106,145 | 4/1992 | Corder | 296/107 |
| 5,161,852 | 11/1992 | Alexander et al. | 296/108 |
| 5,186,516 | 2/1993 | Alexander et al. | 296/121 |
| 5,301,987 | 4/1994 | Tokarz et al. | 292/39 |
| 5,429,409 | 7/1995 | Corder et al. | 296/108 |
| 5,490,709 | 2/1996 | Rahn | 296/122 |
| 5,520,432 | 5/1996 | Gmeiner et al. | 296/107 |
| 5,533,777 | 7/1996 | Kleemann et al. | 296/117 |
| 5,542,735 | 8/1996 | Furst et al. | 296/107 |
| 5,599,056 | 2/1997 | Schmitt | 296/122 |

APPARATUS FOR ACHIEVING AUTOMOTIVE VEHICLE ROOF ISOLATION

This is a continuation of U.S. patent application Ser. No. 08/480,272, filed Jun. 7, 1995, now abandoned.

BACKGROUND AND SUMMARY OF THE INVENTION

This invention generally relates to automotive vehicle roofs and particularly to an apparatus for isolating an automotive vehicle roof from the adjacent body structure.

Convertible automotive vehicles typically employ a retractable soft top roof assembly or a retractable hard-top roof assembly. These convertible roof assemblies are commonly pivoted about quarter panel sections of the automotive vehicle body for movement between a fully extended position, covering a passenger compartment, and a fully retracted position within a boot or trunk compartment. When fully extended, a number one roof bow of the roof assembly is latched to the front header of the body which also supports the windshield. However, the vehicle bodies, especially those with convertible roof assemblies, are prone to excessive road-induced noise, vibration and twisting. Some of these conventional roofs have been known to crack or otherwise exhibit undesirable damage due to these vibrations and body twisting forces passing to the roof through its mounting locations to the body.

These conventional roofs are directly coupled to brackets and, in turn, the quarter panel sections of the body in a metal-to-metal manner which allows for an unattenuated noise, vibration and force transmission path from the body to the roof or linkages coupled therebetween. Examples of such traditional roof mounting constructions are shown within the following U.S. Pat. Nos. 5,161,852 entitled "Convertible Top With Improved Geometry" which issued to Alexander et al. on Nov. 10, 1992; 5,004,291 entitled "Top Framework of a Folding Top for Vehicles" which issued to Bauer et al. on Apr. 2, 1991; 4,984,841 entitled "Folding Top for Vehicles" which also issued to Bauer et al. on Jan. 15, 1991; 4,720,133 entitled "Convertible Top Structure" which issued to Alexander et al. on Jan. 19, 1988; 4,573,732 entitled "Convertible Top Frame" which issued to Muscat on Mar. 4, 1986; and 3,994,524 entitled "Control Linkage for Foldable Top Motor Vehicles" which issued to Lehmann on Nov. 30, 1976; all of which are incorporated by reference herewithin.

Many conventional convertible roof assemblies also employ a hinging device between roof sections. These hinging devices typically include direct metal-to-metal coupling thereby providing an unattenuated noise, vibration and force transmission path between roof sections. Examples of such constructions are shown within the following U.S. Pat. Nos. 4,958,882 entitled "Folding Top for Vehicles" which issued to Kolb on Sep. 25, 1990; 4,854,634 entitled "Upper Body Structure for a Convertible Vehicle" which issued to Shiraishi et al. on Aug. 8, 1989; 4,840,421 entitled "Vehicle Convertible Top Frame Side Rail Linkage Assembly" which issued to Hennessy on Jun. 20, 1989; and 3,575,464 entitled "Follding [sic] Retractable Hard Top" which issued to Himka on Apr. 20, 1971; 3,047,332 entitled "Convertible Top" which issued to Carpenter on Jul. 31, 1962; all of which are incorporated by reference herewithin.

It is also known to provide a variety of latching mechanisms between convertible roof assemblies and the front header or a tonneau cover of the automotive vehicle body. These traditional latch and striker systems provide a direct metal-to-metal coupling thereby allowing an unattenuated noise, vibration and force transmission path between the vehicle body and convertible roof assembly. Examples of such systems are shown within the following U.S. Pat. Nos. 5,301,987 entitled "Convertible Top Stack Latch" which issued to Tokarz et al. on Apr. 12, 1994; 5,186,516 entitled "Power Latch System" which issued to Alexander et al. on Feb. 16, 1993; 5,085,483 entitled "Convertible Top Latching Mechanism" which issued to Alexander on Feb. 4, 1992; 4,746,162 entitled "Combined Removable Panel-Convertible Top System" which issued to Muscat on May 24, 1988; 4,702,505 entitled "Convertible Top Latch Mechanism" which issued to Alexander on Oct. 27, 1987; 4,618,180 entitled "Latching Mechanism for Convertible Top" which issued to Muscat on Oct. 31, 1986; and 3,425,742 entitled "Locking Means for Locking the Top of a Convertible Automobile" which issued to Rauber, Jr. on Feb. 4, 1969; all of which are incorporated by reference herewithin.

In accordance with the present invention, the preferred embodiment of an isolation apparatus reduces noise, vibrations and destructive twisting forces otherwise transmitted between an automotive vehicle body and roof. In one aspect of the present invention, a striker isolator is provided. In another aspect of the present invention, a roof pivot isolator is provided. In yet another aspect of the present invention, a hinge isolator is provided between a pair of foldable roof sections.

The apparatus of the present invention is advantageous over conventional constructions in that the present invention attenuates and reduces vibrational and twisting forces by absorbing part movement caused by these vibrations and forces; this absorption is made possible by placement of the apparatus within the otherwise direct vibration and force transmission path between the roof assembly and body. Therefore, the present invention acts to reduce cracking or bending of convertible roof assembly components due to body twisting and vibrations. The apparatus of the present invention also serves to reduce annoying road noise-induced audible sound waves otherwise passed up through the body and roof as vibrational frequencies. These roof-carried sound waves are especially annoying due to their close proximity to a vehicle occupant's ears. Another advantage of the present invention is the ability to absorb tolerance mismatches between components and to soften the impact of components when mating, interfacing or otherwise moving. This leads to a more refined and quiet operation of the convertible roof assembly. Additional advantages and features of the present invention will become apparent from the following description and appended claims, taken in conjunction with the accompanying drawings.

DETAILED DESCRIPTION OF THE PREFERRED EMBODIMENT

Figure 1:
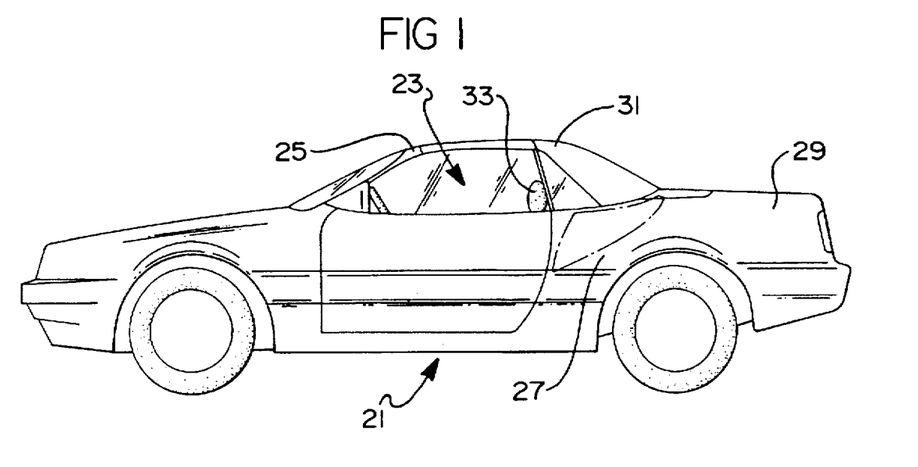
FIG. 1 is a side elevational view showing an automotive vehicle employing the preferred embodiments of an apparatus of the present invention.
Figure 2:
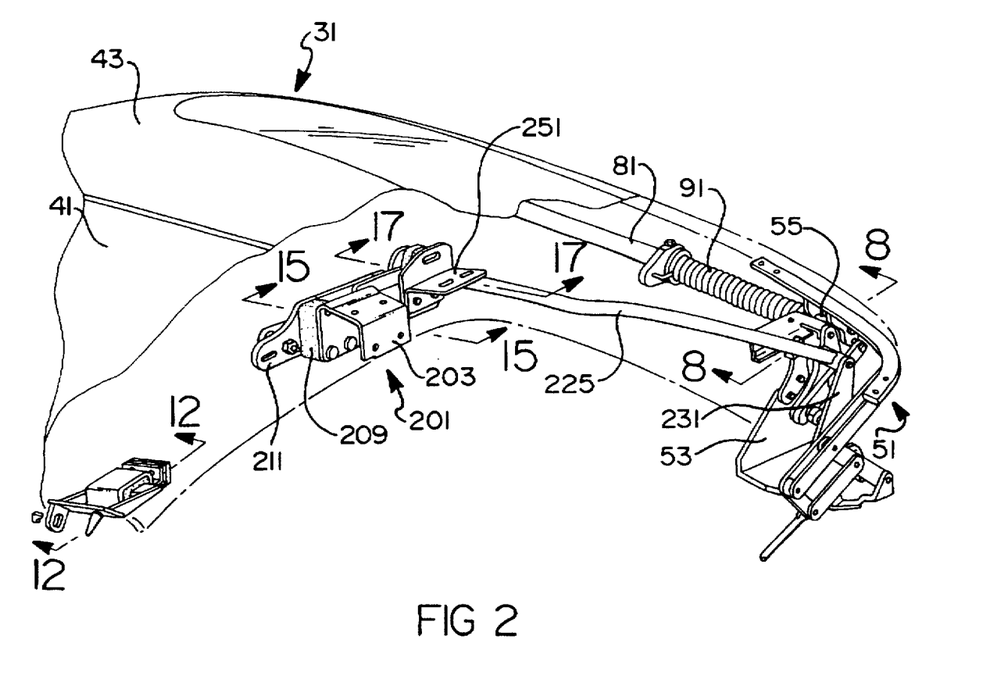
FIG. 2 is a perspective view, with portions broken away therefrom, showing the preferred embodiments of the apparatus of the present invention.
Figure 3:
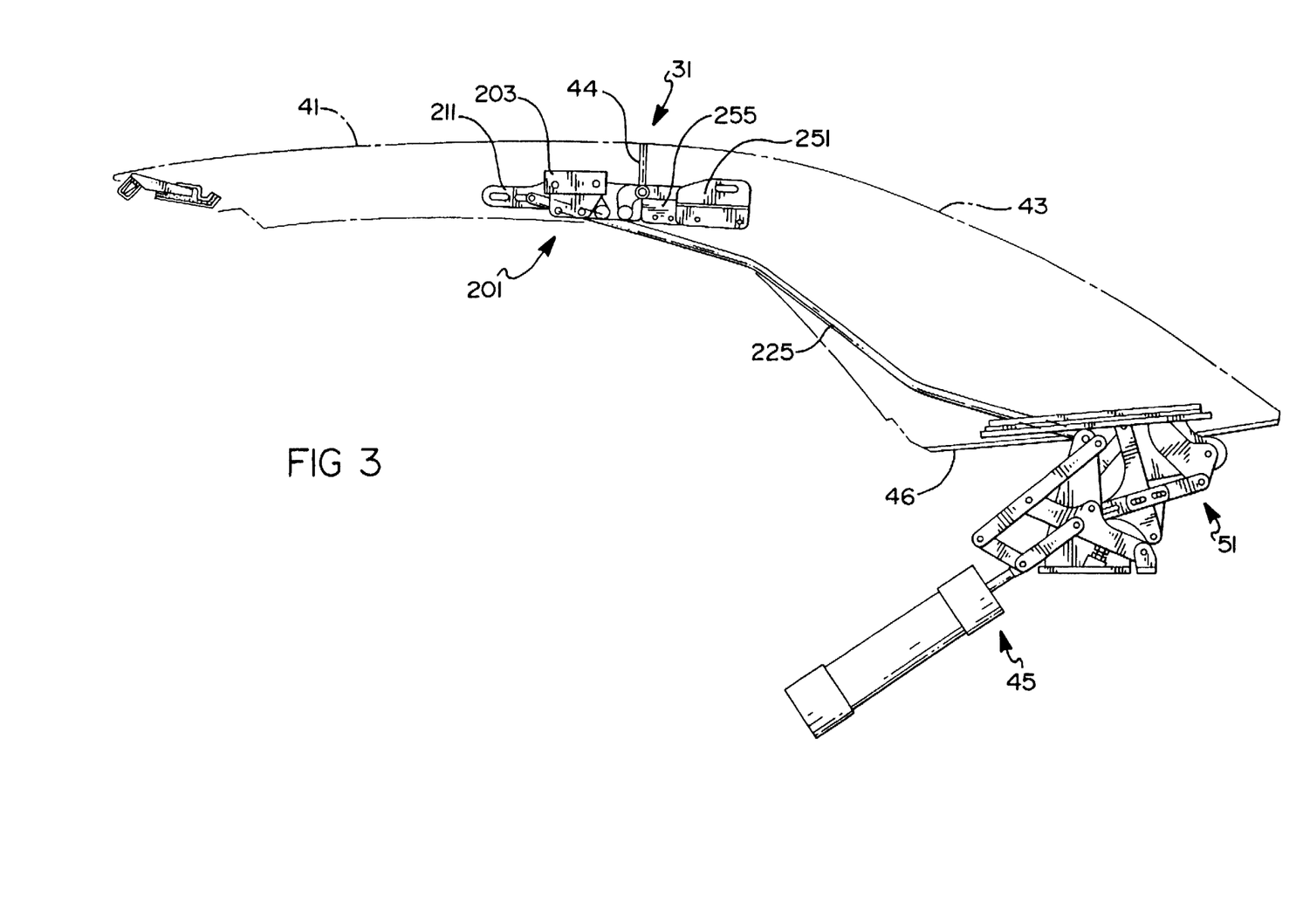
FIG. 3 is a side elevational view showing the preferred embodiments of the apparatus of the present invention with a convertible roof assembly in an extended position.
Figure 4:
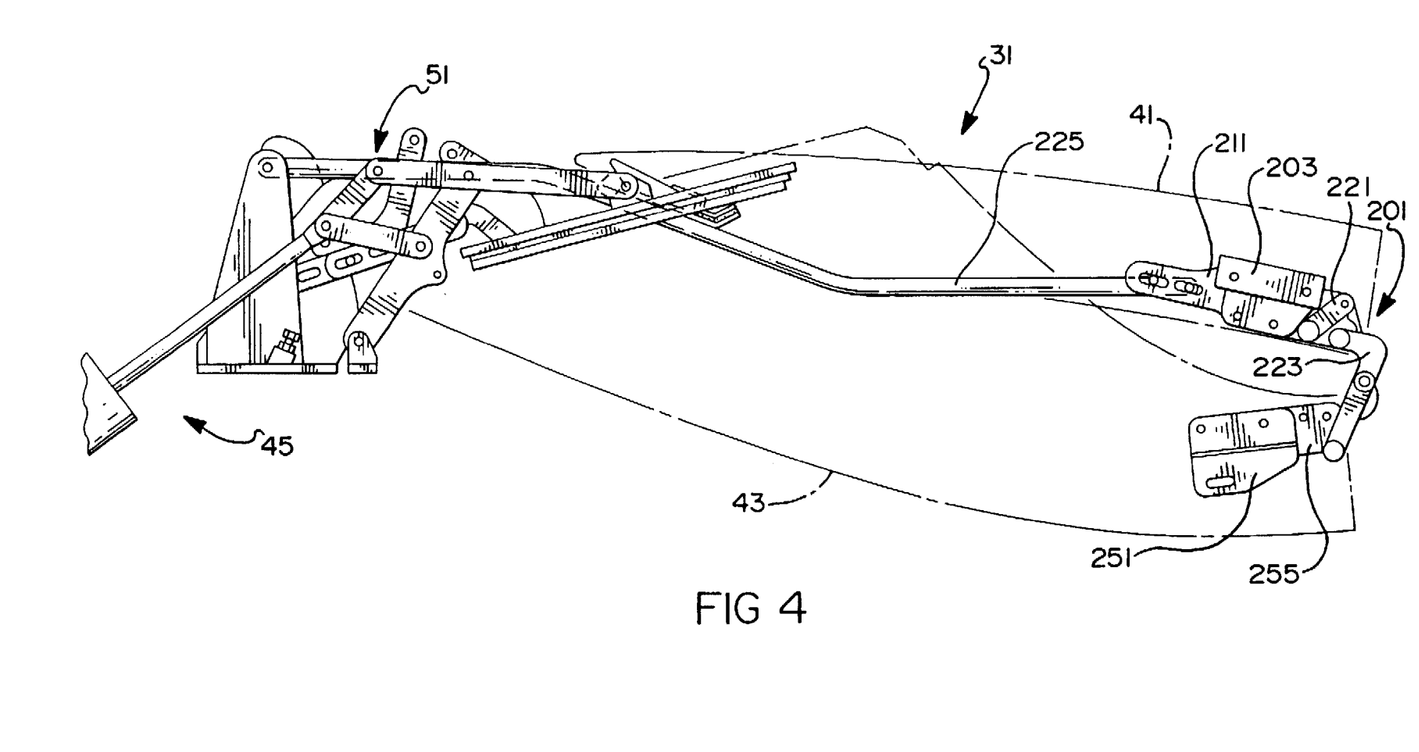
FIG. 4 is a side elevational view showing the preferred embodiments of the apparatus of the present invention with the roof assembly in a retracted position.
Figure 5:
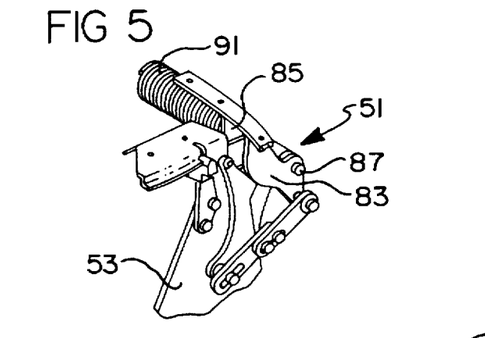
FIG. 5 is a perspective view, with portions broken away therefrom, showing the preferred embodiment of a rear pivot isolator apparatus of the present invention with the roof assembly in an extended position.
Figure 6:
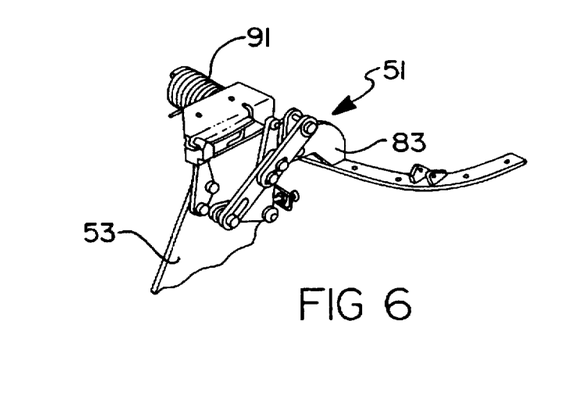
FIG. 6 is a perspective view, with portions broken away therefrom, showing the preferred embodiment rear pivot isolator apparatus of the present invention with the roof assembly in a retracted position.
Figure 7:
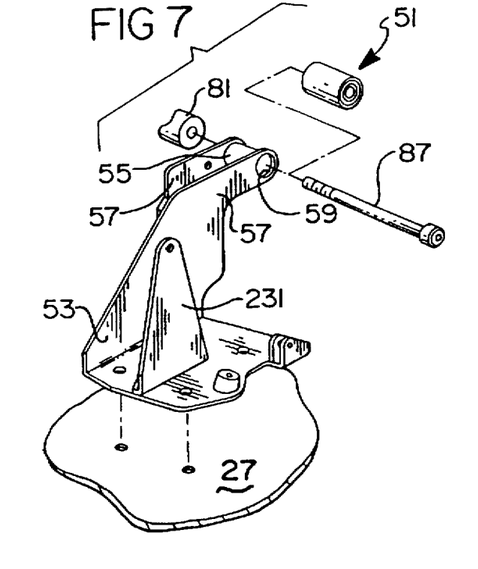
FIG. 7 is an exploded perspective view showing the preferred embodiment rear pivot isolator apparatus of the present invention.

Referring to FIGS. 1–4, an automotive vehicle has a body 21 including a passenger compartment 23, a windshield supporting front header 25, quarter panel sections 27 and a trunk compartment 29. A convertible roof assembly 31 is movable from a fully extended position (as shown in FIG. 3) to a fully retracted position behind a front seat 33 (as shown in FIG. 1), within a boot (not shown) or within trunk compartment 29 (as shown in FIG. 4). Convertible roof assembly 31 is preferably shown and described hereinafter as an inwardly clamshelling hard-top consisting of a front roof section 41 and a rear roof section 43 with a weatherstrip 44 therebetween. As is known in the art, other bulbous weatherstrips 46 are also disposed between each roof section and the adjacent portion of body 21. A hydraulically operated driving mechanism 45, illustrated in FIG. 3, or an electric motor actuated driving system (not shown) is coupled to roof assembly 31 through driving linkages for creating retraction and extension thereof. Hard-top roof assemblies are especially susceptible to body twisting-induced breakage due to their stiffness and weight. However, a fabric covered, soft-top convertible roof assembly may also be employed in combination with the apparatus of the present invention.

The preferred embodiment of a rear pivot isolator apparatus 51 of the present invention can best be seen in FIGS. 2 and 5–9. On each side of the vehicle body 21, a bracket 53 is bolted to a quarter inner panel of quarter panel section 27 (see FIG. 1). Bracket 53 further has a cylindrical brace 55 welded between two generally parallel, vertical walls 57. A cylindrical passageway 59 extends through brace 55 in a transverse or crosscar manner. Bracket 53 and brace 55 are preferably made from high strength steel.

Pivot isolator 51 includes a cylindrical inner collar 71, a cylindrical outer collar 73 and elastomeric material 77 therebetween. Inner collar 71 further includes a cylindrical inside surface defining a bore 79. Collars 71 and 73 are preferably made from SAE 1015 cold drawn seamless tubing or machined from 12L14 steel bar. Elastomeric material 77 is preferably ASTM D2000 rubber with an adhesive primer between elastomeric material 77 and the adjacent collars 71 and 73. A 45 degree lead-in chamfer is disposed around an inboard edge of brace passageway 59 to ease assembly. A swedge tool is used to compress pivot isolator apparatus 51 into passageway 59 of brace 55. This further provides an approximately 2,000ths of an inch outer collar compression and preload upon elastomeric material 77.

Figure 8:
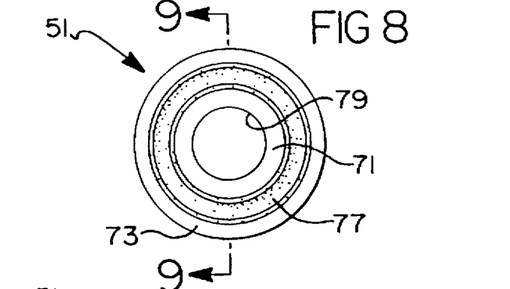
FIG. 8 is a sectional view, taken along line 8—8 of FIG. 2, showing the preferred embodiment rear pivot isolator apparatus of the present invention.
Figure 9:
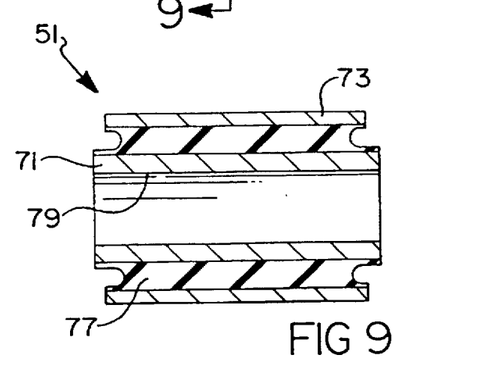
FIG. 9 is a cross sectional view, taken along line 9—9 of FIG. 8, showing the preferred embodiment rear pivot isolator apparatus of the present invention in a free state.
Figure 10:
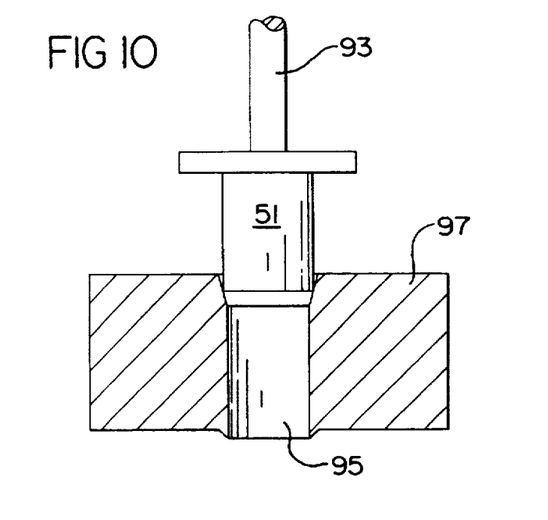
FIG. 10 is a diagrammatic view of a manufacturing device employed to produce the preferred embodiment rear pivot isolator apparatus of the present invention.

A torque tube 81, extending transversely between the pair of brackets 53, is coaxially aligned with bore 79 of each pivot isolator apparatus 51 when assembled. A pair of roof flanges 83 and 85 also have apertures which are coaxially aligned with bore 79 of each pivot isolator apparatus 51 such that a partially threaded pivot bolt 87 can be inserted therethrough. The threaded end of pivot bolt 87 is enmeshed with internal threads of torque tube 81. A helically coiled torsion spring 91 is wrapped around part of torque tube 81 for supplying a counterbalancing biasing force to aid in movement of roof assembly 31. One end of spring 91 is rotatably moved in conjunction with roof movement while the other end is fixed to torque tube 81. Therefore, elastomeric material 77 compressibly absorbs noise, vibrations and twisting forces passed from quarter panel sections 27 (see FIG. 1) through each bracket 53, through each brace 55 and to each outer collar 73. The thickness of elastomeric material 77 can be adjusted depending upon the amount of twisting forces and motion anticipated. The method of producing pivot isolator apparatus 51 will be described hereafter with reference to FIGS. 8–10. Collars 71 and 73 are first inserted into a fixture such as a mold. Next, heated rubber pellets are pressed between collars 71 and 73. At this point, pivot isolator apparatus 51 is in an unloaded or free state as is shown in FIGS. 8 and 9. It has been found, however, that such an apparatus will function better if given a preload. Therefore, a hydraulic ram 93 is used to push pivot isolator apparatus 51 through a smaller cylindrical channel 95 within a die 97. Thus, outer collar 73 is inwardly crushed to provide a 40,000ths of an inch preload upon elastomeric material 77. Furthermore, this preload causes elastomeric material 77 to outwardly expand.

Figure 11:
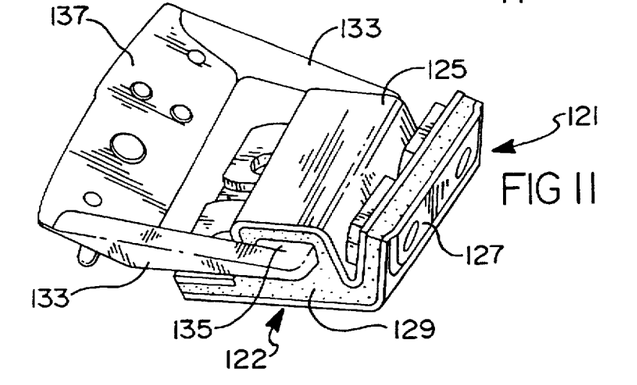
FIG. 11 is a perspective view showing the preferred embodiment of a striker isolator apparatus of the present invention.
Figure 12:
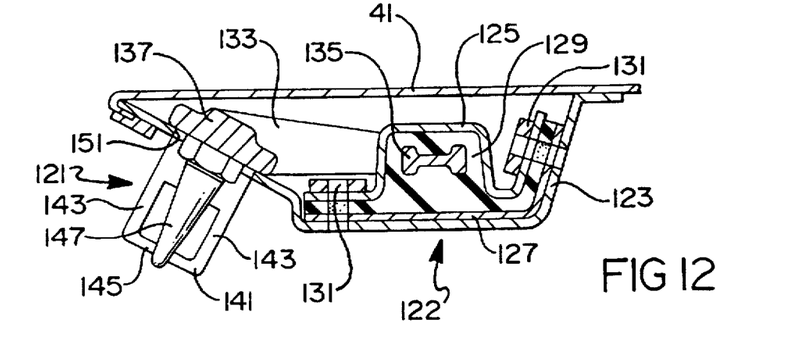
FIG. 12 is a sectional view, taken along line 12—12 of FIG. 2, showing the preferred embodiment striker isolator apparatus of the present invention.
Figure 13:
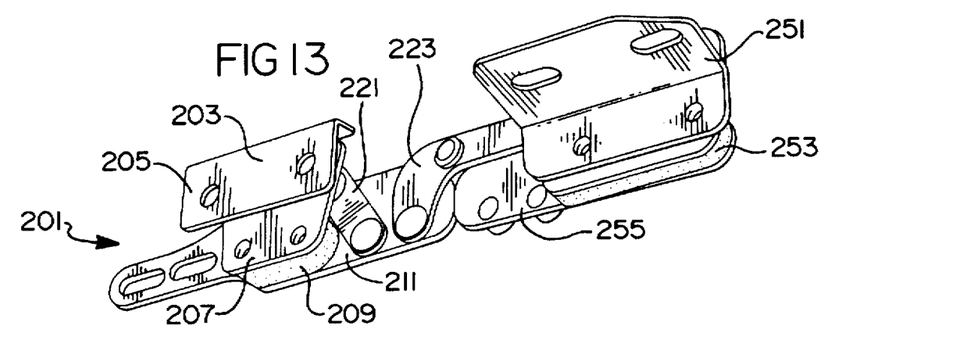
FIG. 13 is a perspective view showing the preferred embodiment of a hinge isolator apparatus of the present invention.
Figure 14:
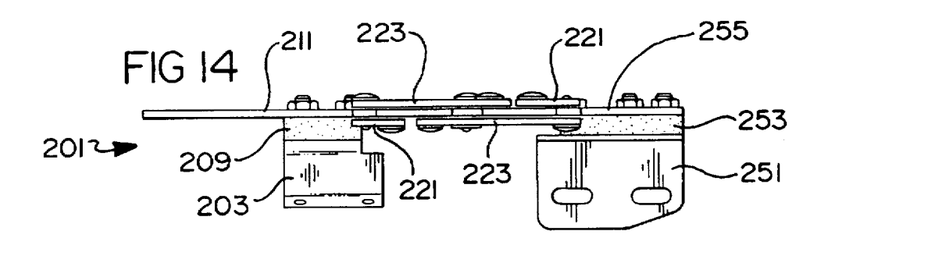
FIG. 14 is a top elevational view showing the preferred embodiment hinge isolator apparatus of the present invention.
Figure 15:
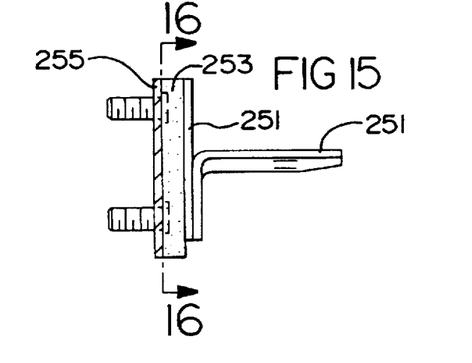
FIG. 15 is a cross sectional view, taken along line 15—15 of FIG. 2, showing the preferred embodiment hinge isolator apparatus of the present invention.
Figure 16:
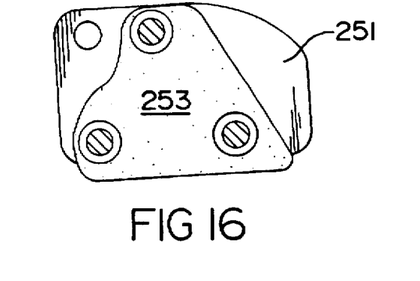
FIG. 16 is a sectional view, taken along line 16—16 of FIG. 15, showing the preferred embodiment hinge isolator apparatus of the present invention.
Figure 17:
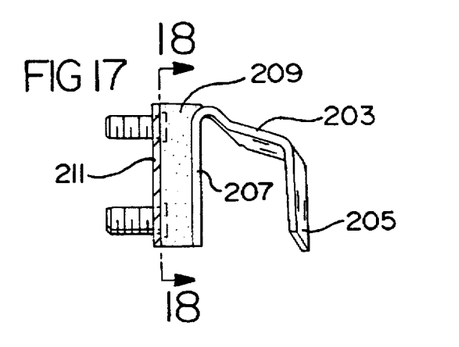
FIG. 17 is a cross sectional view, taken along line 17—17 of FIG. 2, showing the preferred embodiment hinge isolator apparatus of the present invention.
Figure 18:
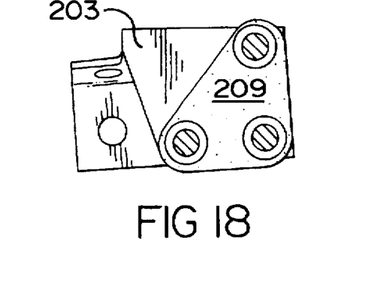
FIG. 18 is a sectional view, taken along line 18—18 of FIG. 17, showing the preferred embodiment hinge isolator apparatus of the present invention.

The preferred embodiment of a pair of striker isolator apparatuses 121 of the present apparatus are best shown in FIGS. 11 and 12. Each striker isolator apparatus 121 preferably has a base 122 mounted between a forwardmost or number one roof bow 123 and a roof panel of front roof section 41. However, this apparatus 121 can also be employed upon a rearmost or number five roof bow, or alternately upstanding from a front header, tonneau cover, trunk lid or quarter panel. Each striker isolator apparatus 121 includes a base retainer 125, a base backing 127 and elastomeric material 129 therebetween, all of which are secured to roof bow 123 by bolts or rivets 131. Striker isolator apparatus 121 further includes a pair of longitudinally oriented extension arms 133 joined by a base bridging member 135 and a striker support bridging member 137. Base bridging member 135 is suspended within elastomeric material 129. A generally U-shaped or apertured striker 141 is secured to striker support 137 by upsetting ends of legs 143 or by use of welds, threaded nuts or the like. Across member 145 extends in a longitudinal direction between legs 143 for engagement by a linearly movable or pivotable latch or catch. Such a latch arrangement is shown within U.S. Pat. No. 5,301,987. A substantially conical locator pin 147 also projects generally downward from striker support 137 for engagement with an opening or cavity in front header 25 (see FIG. 1). Both striker 141 and locator pin 147 extend through apertures 151 of roof bow 123. Base retainer 125 and backing 127 are preferably stamped from SAE 1010-1008 AR110 LC steel, with E-coat thereon, and then both are placed into a tool in combination with base bridging member 135 while elastomeric material 129 is injection molded or otherwise pressed therebetween from a natural or synthetic rubber material. A preload is then applied. Extension arms 133 and bridging members 135 and 137 are preferably made from cast aluminum or stamped steel.

Referring now to FIGS. 2–4 and 13–18, the preferred embodiment of a pair of hinge isolator apparatuses 201 of the present invention movably couple each outboard side of front roof section 41 to rear roof section 43. Within each hinge isolator apparatus 201, a front mounting bracket 203 has a substantially inverted U-shaped configuration with a side rail flange 205 bolted or riveted to a longitudinally oriented side rail (not shown) of front roof section 41. An inboard flange 207 of front mounting bracket 203 has elastomeric material 209 secured thereto through pressing, adhesive, encapsulating injection molding or other known methods. A front hinge plate 211 is also secured on an opposite face of elastomeric material 209 in a preloaded manner. Front hinge plate 211 has a set of weld studs mounted thereto upon which a set of straight and L-shaped links, respectively 221 and 223, are pivotably mounted. A balance link 225 is pivotably coupled to front hinge plate 211 and an upright structure 231 of bracket 53.

Similarly, a pair of joined rear mounting brackets 251 are attached a side rail (not shown) of rear roof section 43. Elastomeric material 253 is secured between rear mounting bracket 251 and a rear hinge plate 255 in a preloaded manner. A set of straight and L-shaped linkages, respectively 221 and 223, are also attached to weld studs extending from rear hinge plate 255. The brackets, hinge plates and linkages are preferably made from SAE 1008–1010 CRLC steel within an E-coat. The specific hinge foldably operates like that disclosed within U.S. patent application Ser. No. 08/163,374 entitled "Hinge for a Folding Roof in a Convertible Automotive Vehicle" which was filed on Dec. 7, 1993 and is incorporated by reference herewithin. Therefore, elastomeric material 209 and 253 serves to reduce undesired noise, vibrations and twisting forces transmitted from body 27 (see FIG. 1), through each bracket 53, along each balance link 225 and through front hinge plate 211, from passing to roof assembly 31. It also serves to reduce noise, vibrations and twisting forces between roof sections.

While the preferred embodiments of this roof isolation apparatus has been disclosed, it will be appreciated that various modifications may be made without departing from the present invention. For example, each isolator apparatus embodiment can be used independently from each other or in any combination. Furthermore, a striker can be directly attached to a header or roof bow, without extension and bridging members, but with an elastic material therebetween. Also, a variety of other striker, roof and driving linkage configurations can be employed such as those disclosed in the afore-referenced patents. In another alternate embodiment, the roof assembly or even the balance link can pivot about an exterior collar of the pivot isolator apparatus while an inner collar is coupled to the vehicle body. Alternate elastic members may replace or supplement the elastomeric material elastic member mentioned hereinabove; for example, leaf springs, compression springs, flexible arms, urethane foam or the like may be inserted between pairs of rigid members. A synthetic elastomer such as Santoprene® can also be injection molded or adhered between pairs of rigid and separate isolator members or directly between linkage or plate members. Various materials and shapes have been disclosed in an exemplary fashion, however, a variety of other materials and shapes may of course be employed. It is intended by the following claims to cover these and any other departures from the disclosed embodiments which fall within the true spirit of this invention.

The invention claimed is:

1. An apparatus for use in an automotive vehicle comprising:
    a convertible roof assembly movable between an extended position and a retracted position;
    an automotive vehicle body having a fixed windshield header;
    a weatherstrip being disposed between and directly contacting against said roof assembly and said header;
    elastomeric material disposed between a portion of said roof assembly and said automotive vehicle body;
    a pivot isolator including said elastomeric material;
    a rear section of said roof assembly pivotably coupled to said pivot isolator;
    said elastomeric material being positioned in a vibrational path otherwise present between said rear section of said roof assembly and said automotive vehicle body for reducing vibrational transmission;
    a bracket directly attaching to a quarter panel section of said automotive vehicle body, said pivot isolator being stationarily affixed to said bracket, said bracket further including a brace mounted between a pair of substantially parallel walls, said pivot isolator being located within a passageway of said brace; and
    a fastener extending through said pivot isolator securing said roof assembly to said bracket;
    whereby said elastomeric material reduces vibrations from passing between said body and said roof assembly.

2. The apparatus of claim 1 further comprising a striker extending from a roof bow of said roof assembly with a second elastomeric material disposed between said striker and said roof bow.

3. The apparatus of claim 2 further comprising:
    a pair of extension arms extending between a pair of substantially parallel bridging segments, a first of said bridging segments being encapsulated within said elastomeric material, a second of said bridging segments having said striker secured thereto; and
    a base affixed to said roof bow, said base retaining said elastomeric material and said first bridging segment to said roof bow.

4. The apparatus of claim 1 further comprising said fastener defining a bolt centrally extending through a bore of said pivot isolator and retaining a flange extending from said rear section of said roof assembly to said pivot isolator, said rear section being of a hard-top type.

5. The apparatus of claim 4 further comprising:

a torque tube transversely extending across said body, said torque tube coaxially aligning with said bore of said pivot isolator, said bolt further engaging with said torque tube; and a helically coiled spring wrapping around said torque tube and serving to counterbalance said roof assembly.

6. The apparatus of claim 1 wherein said pivot isolator includes:

an inner collar having a substantially cylindrical shape;

an outer collar having a substantially cylindrical shape concentrically surrounding said inner collar; and said elastomeric material securely disposed between said inner and outer collars for reducing vibrations therebetween.

7. The apparatus of claim 1 further comprising:

a first hinge plate attached to a front section of said roof assembly;

a second hinge plate attached to a rear section of said roof assembly; and a first portion of a second elastomeric material disposed between said first hinge plate and said front section of said roof assembly.

8. The application of claim 7 further comprising:

a second portion of said elastomeric material disposed between said second hinge plate and said rear section of said roof assembly; and said elastomeric material reducing vibrations from passing between said front and rear sections of said roof assembly.

9. The apparatus of claim 7 further comprising:

a pair of substantially L-shaped links; and a pair of substantially straight links having first ends pivotably coupled to said L-shaped links and having second ends pivotably coupled to said hinge plates.

10. The apparatus of claim 7 further comprising a balance link pivotably coupled to a bracket affixed to said automotive vehicle body, said balance link also pivotably coupled to said first hinge plate.

11. The apparatus of claim 1 wherein at least a majority of said elastomeric material is trapped between a pair of substantially rigid members even when said roof assembly is disposed in said retracted position.

12. The apparatus of claim 1 wherein said roof assembly has an entirely rigid front roof section and a rear roof section which inwardly fold in a clamshelling manner against each other.

13. An apparatus for use in an automotive vehicle comprising:

an automotive vehicle roof assembly;

an automotive vehicle body having said roof assembly attachable to said body;

a latching member;

a pivot assembly;

a first elastomeric material member being disposed between said latching member and said roof assembly;

a pair of extension arms extending between a pair of substantially parallel bridging segments, a first of said bridging segments being encapsulated within said first elastomeric material, said latching member being secured to a second of said bridging segments;

a base being affixed to said roof assembly and retaining said first elastomeric material and said first bridging segment to said roof assembly; and a second elastomeric material member being disposed within said pivot assembly.

14. The apparatus of claim 13 wherein said pivot assembly includes:

a pivot isolator internally containing said second elastomeric material;

a rear portion of said roof assembly being pivotably coupled to said pivot isolator; and said second elastomeric material member being positioned within a vibrational path otherwise present between said rear portion of said roof assembly and said automotive vehicle body for reducing vibrational transmission.

15. The apparatus of claim 13 wherein said latching member is defined as a striker extending from a roof bow of said roof assembly with said first elastomeric material disposed between said striker and said roof bow.

16. The apparatus of claim 13 further comprising:

a first hinge plate attached to a front section of said roof assembly;

a second hinge plate attached to a rear section of said roof assembly;

at least one linkage pivotably extending between said hinge plates; and a third elastomeric material member being disposed between said first hinge plate and said front section of said roof assembly.

17. The apparatus of claim 14 wherein said pivot isolator further includes a second rigid cylindrical collar concentrically surrounding a first collar, said elastic member being a single and contiguous material disposed between said collars.

18. The apparatus of claim 17 further comprising:

a bolt;

said first collar having a bore for pivotably receiving said bolt;

a roof flange also having an aperture for pivotably receiving said bolt; and a bracket directly retaining said second collar.

19. An apparatus for use in a convertible roof assembly of an automotive vehicle comprising:

a pivot isolator having an elastic member disposed against a first rigid cylindrical collar, said pivot isolator further including a second rigid cylindrical collar concentrically surrounding said first collar, said elastic member being disposed between said collars;

a bolt;

said first collar having a bore for pivotably receiving said bolt;

a roof flange also having an aperture for pivotably receiving said bolt;

a bracket directly retaining said second collar;

a torque tube transversely extending across said vehicle, said torque tube coaxially aligning with said bore of said pivot isolator, said bolt further engaging with said torque tube; and a helically coiled spring wrapping around said torque tube and serving to counterbalance said roof assembly.

20. An apparatus for use in an automotive vehicle comprising:

a set of structural members including a convertible roof assembly and a body of said automotive vehicle, said body including a fixed windshield header;

a retraction mechanism being operable to extend and retract said roof assembly, a spring of said retraction mechanism serving to counterbalance said roof assembly, an elongated member extending crosscar substantially between a pair of said retraction mechanisms, said spring being coupled to and surrounding a portion of said elongated member;

an attaching element attached to one of said structural members and coupling said roof assembly to said body;

an elastic member disposed between said attaching element and said one of said structural members; and an elongated fastener serving as a pivot axis for said roof assembly, said fastener engaging said elongated member.

* * * * *

UNITED STATES PATENT AND TRADEMARK OFFICE
CERTIFICATE OF CORRECTION

PATENT NO. : 5,779,299
DATED : July 14, 1998
INVENTOR(S) : George F. Purcell et al It is certified that error appears in the above-indentified patent and that said Letters Patent is hereby corrected as shown below:

On the Title Page under U.S. Patent Documents, reference 3,666,317, "Podwya" should be -- Podwys --.

Column 5, line 48, after "attached" insert -- to --.

Column 6, line 34, "mate rial" should be -- material --.

Column 7, line 32, "application" should be -- apparatus --.

Signed and Sealed this

Eleventh Day of May, 1999

Attest:

Q. TODD DICKINSON

*Attesting Officer*   *Acting Commissioner of Patents and Trademarks*